United States Patent [19]

Beckwith et al.

[11] Patent Number: 4,623,498

[45] Date of Patent: Nov. 18, 1986

[54] METHOD OF IMPROVING QUALITY OF HOT PRESSED $Si_3N_4$ BODIES

[75] Inventors: Elaine C. Beckwith, Riverview; Andre Ezis, Grosse Ile, both of Mich.

[73] Assignee: Ceradyne Advanced Products, Inc., Costa Mesa, Calif.

[21] Appl. No.: 630,178

[22] Filed: Jul. 12, 1984

Related U.S. Application Data

[63] Continuation-in-part of Ser. No. 444,249, Sep. 30, 1982, abandoned.

[51] Int. Cl.$^4$ .................. C04B 35/58; C04B 38/04
[52] U.S. Cl. ........................... 264/65; 264/49; 264/66; 264/344; 423/344; 501/97
[58] Field of Search .............. 264/49, 65, 66, 344, 264/345; 501/97; 423/344

[56] References Cited

U.S. PATENT DOCUMENTS

| | | | |
|---|---|---|---|
| 966,399 | 8/1910 | Higgins | 423/345 |
| 3,839,540 | 10/1974 | Arrol | 501/97 |
| 4,146,379 | 3/1979 | Copley et al. | 501/108 |
| 4,177,235 | 12/1979 | Neidhardt | 264/344 |
| 4,238,434 | 12/1980 | Enomoto | 264/63 |

FOREIGN PATENT DOCUMENTS 58-91017  5/1983  Japan ............................ 423/344

Primary Examiner—James Derrington
Attorney, Agent, or Firm—Leonard Tachner

[57] ABSTRACT

A method of improving the quality of hot pressed $Si_3N_4$ bodies is disclosed. Unpurified silicon powder and admixed oxygen carrying agents are compacted to form a preform. The preform is nitrided, facilitated by the presence of certain impurities, to agglomerate the mixture to an increased density no greater than 2.7 gm/cm$^3$. The nitrided preform is immersed in one or more stages in one or more leaching solutions of effective concentration to remove the selected impurities. The treated preform is then hot pressed to full density accompanied by a substantial reduction or absence of undesirable impurities such as iron silicide, which can conventionally form during hot pressing.

13 Claims, 12 Drawing Figures

POLISHED FIG. 1a
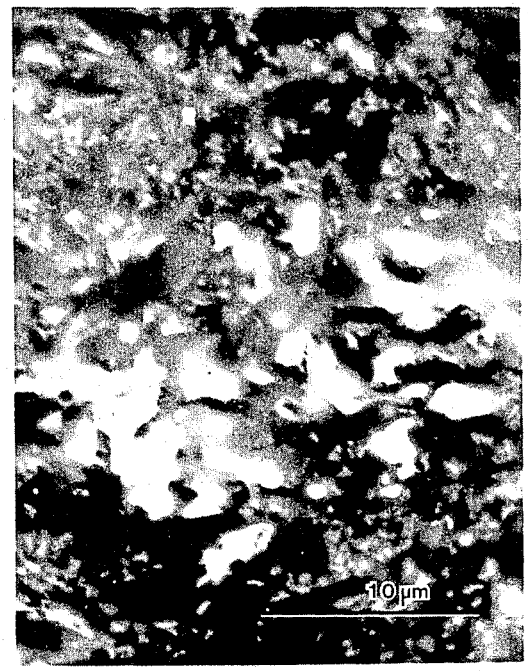
POLISHED FIG. 1b
MACHINED FIG. 1c
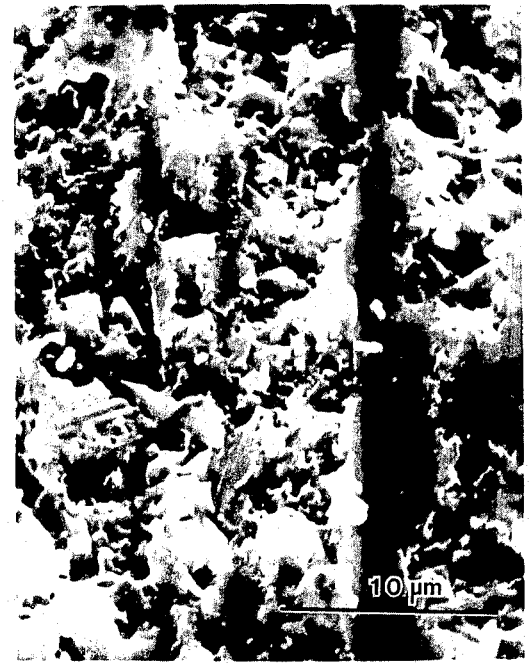
MACHINED FIG. 1d

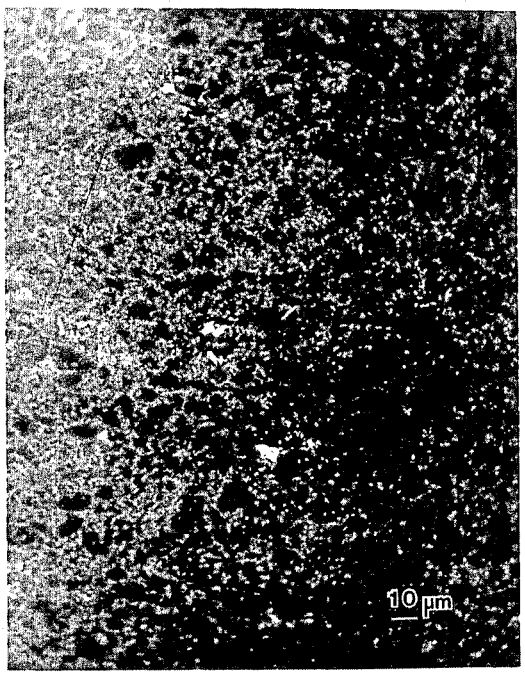
POLISHED FIG. 1e
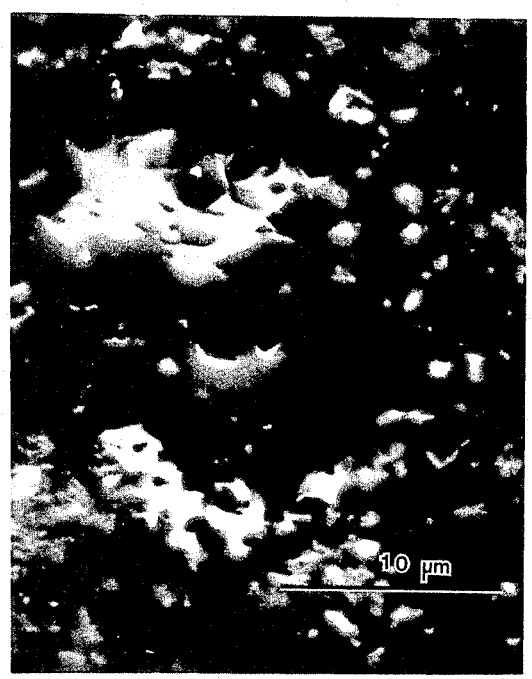
POLISHED FIG. 1f
MACHINED FIG. 1g
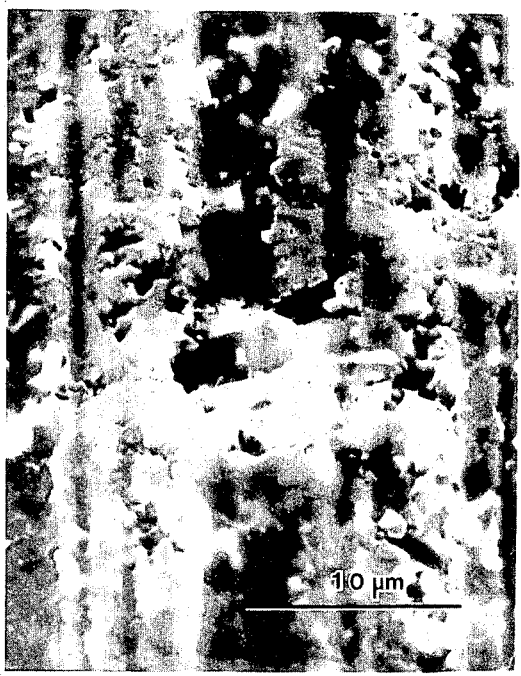
MACHINED FIG. 1h

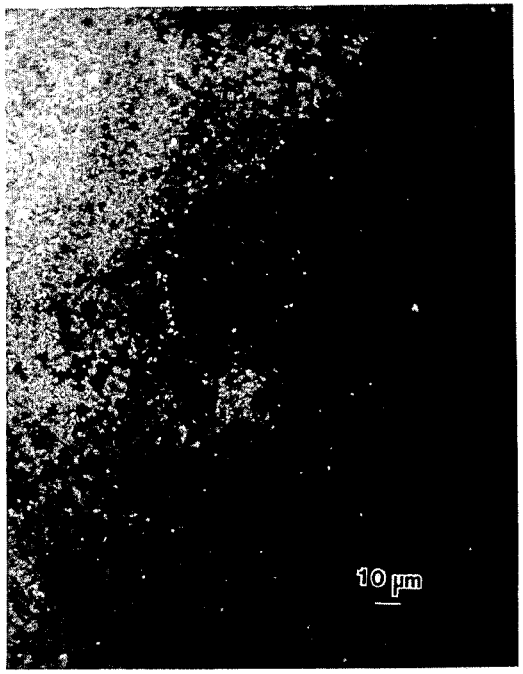
POLISHED FIG. 1i
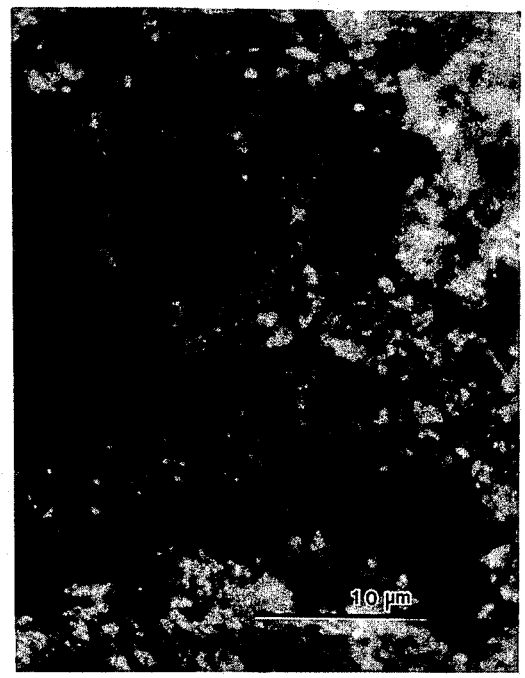
POLISHED FIG. 1j
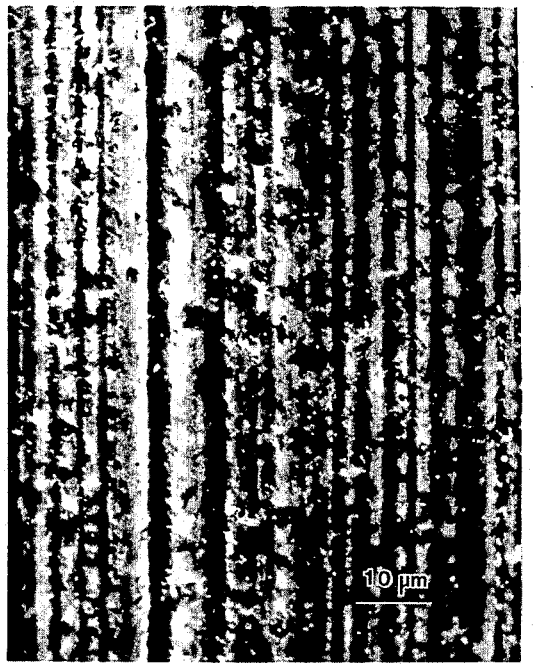
MACHINED FIG. 1k
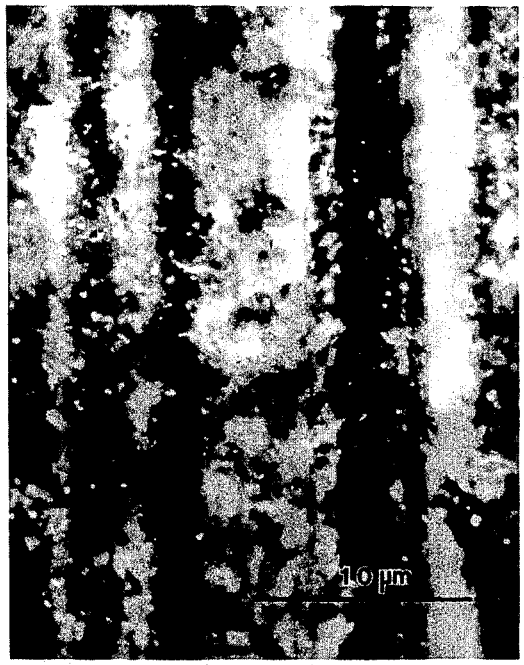
MACHINED FIG. 1l

METHOD OF IMPROVING QUALITY OF HOT PRESSED SI₃N₄ BODIES

RELATED CASES

This is a continuation-in-part of U.S. application Ser. No. 444,249, filed Sept. 30, 1982, now abandoned.

BACKGROUND OF THE INVENTION AND STATEMENT REGARDING PRIOR ART

Silicon metal powders, used as a starting material for manufacturing silicon nitride ceramics, typically contain trace impurities and/or compounds of Fe, Al, Mn, Ni, Co, Cr, and Li. In addition, powder agents are added to the silicon to function as binders or pressing aids during subsequent processing; these agents, often carrying oxygen, contain trace compounds of Ca, Cr, Fe, Mn, and Na. These compounds are useful and, in some cases, generally required to promote efficient nitriding. Reaction bonded $Si_3N_4$ technology may require oxygen carrying agents as part of the starting mixture to facilitate formation of a second phase and densification. It is, however, the impurities that reside in the nitrided body that are significant here because they become the impurities in the final product. The presence of such impurities in the final ceramic product may be detrimental to the development of optimum physical properties. The impurities can produce random flaws which lower the strength of the resulting material and other related properties.

The impurities in the nitrided reaction bonded silicon nitride body typically comprise iron, iron oxide, free silicon, unreacted $Y_2O_3$, and other trace elements, all of which can form silicides, silicates, or other compounds detrimental to optimum physical properties. There is little if any $SiO_2$ present after nitriding and this is a natural result of proper nitriding. The presence of unreacted $Y_2O_3$ is undesirable because it affects the distribution and formation of second phase yttrium containing compounds in the final hot pressed product. The formation of silicides from free iron and/or iron oxide, or other trace elements, is particularly detrimental because during hot pressing, $Si_3N_4$ is readily dissolved in the silicide liquid and precipitates as large grained beta $Si_3N_4$ to define local pockets of silicide, large grains and porosity. These pockets are weak spots or flaws in the material when used as a cutting tool and restrict the wear life of the tool. There may also be produced a concentration of yttrium compounds which affect development of desirable oxynitrides as suitable crystalline binders.

Leaching agents have been used to strip silica from starting powders used for making alumina or silicon carbide, the agents being hydrofluoric or hydrochloric acid (see U.S. Pat. Nos. 4,177,235 and 4,238,434). However, in the process of making $Si_3N_4$ by nitriding, $SiO_2$ is an essential compound in producing the desired secondary phases in the nitrided body; it must not be removed. More importantly, however, even if it were assumed the nitrided body contained $SiO_2$ and such acids were used on such body (which such references do not suggest), the hydrofluoric acid would be too strong and would dissolve necessary intergranular second phases and also silicon nitride, while the hydrochloric acid would be too weak to dissolve $SiO_2$ in such nitrided form. Silicon dioxide is soluble in hydrofluoric acid, and insoluble in hydrochloric acid (G. G. Hawley, The Condensed Chemical Dictionery, page 773 (1977) Van Nostrand Reinhold Company, NY. Thus, the teaching of such references fails to recognize and remove the impurities with which this invention is concerned and has come to understand. Such impurities must be removed at a stage of processing very different than that taught by these references.

It would be desirable if some mode were available that obviated the need for purifying the starting materials and permitted the impurities to serve a useful function during nitriding and other related steps. Such mode would selectively eliminate the impurities at a later stage of the process so that they would not be present in the final product after they have served their useful fabricating function, such as facilitating full or partial nitriding (the latter sufficient to encapsulate the silicon particles). In this manner, the impurities would not be available to promote oxidation or cracking in the final product.

SUMMARY OF THE INVENTION

The invention is a method of making a silicon nitride comprising object, wherein (a) a preform is formed of unpurified silicon powder and oxygen carrying powder agents in an amount effective to form intergranular second phase crystallites with $Si_3N_4$ upon heating in a nitrogen bearing atmosphere; (b) the preform is heated in a nitrogen bearing atmosphere to react the ingredients thereof and to agglomerate the powder to an increased density no greater than 2.7 gm/cm³ (82% of full theoretical), the agglomerated preform containing impurities from the group consisting essentially of silicon, silicides, iron, iron oxide, and other oxygen carrying agents other than $SiO_2$; (c) treating the nitrided agglomerated preform in one or more stages with one or more leaching solutions of effective concentration to remove at least one of said group of impurities; and (d) the treated preform is heated under heat fusing conditions to form a unitary, substantially fully dense, silicon nitride comprising object.

It is preferable if the silicon powder has a purity of at least 97%, preferably above 98%. The oxygen carrying agents are selected from the group consisting of $Y_2O_3$, $Al_2O_3$, $SiO_2$, MgO, $CeO_2$, $ZrO_2$, $HfO_2$, and other rare earth oxides, $SiO_2$ being also present as an oxide coating on the silicon powder. It is preferable to use $Y_2O_3$ and $Al_2O_3$, each having a respective purity of greater than 99.99% and 99.5%. It is advantageous to use a base solution, such as sodium hydroxide, to leach out free silicon and to use an acid solution which is effective to leach out Fe, $Fe_2O_3$, silicides, and unreacted oxygen carrying agents other than $SiO_2$. Such acid may be selected from the group consisting of hydrochloric, sulfuric, acetic, oxalic and nitric.

Impurity removal is carried out after full or partial nitriding as long as the preform has a density no greater than 82% of full theoretical (2.7 gm/cm³) and preferably 50–72% of full theoretical. A preferred leaching solution is an aqueous solution of hydrochloric acid in a concentration of 3–10 molar, optimally about 7 molar. However, a second aqueous solution of sodium hydroxide, potassium hydroxide, or its equivalent, in a concentration of about 5 molar, may separately and additionally be employed to remove other selected impurities, such as free silicon. The leaching solutions are used at a temperature usually at room conditions, and the nitrided preform is immersed therein for a period of preferably 6–48 hours or preferably in accordance with a visual test determined by the degree of yellow color attained in the solution (typically due to $FeCl_3$ in solution).

DESCRIPTION OF THE DRAWINGS

FIG. 1 is a series of photographs of polished (polished with 6/3/1 micron Buehlers diamond microcloth) and machined (320 diamond grit wheel with downfeed per pass was 0.0254 mm or less and finish was 16 microinches) surfaces comparing defects in hot pressed silicon nitride in accordance with the prior art and the lack of defects in the improved material processed according to this invention.

FIG. 1b is a greatly enlarged portion of FIG. 1a, and FIG. 1f is a greatly enlarged portion of FIG. 1e. Each show flaws (bright, white areas) containing iron silicide and yttrium agglomerated areas on polished surfaces on a hot pressed silicon nitride billet made in accordance with the previous art. The surface appearance of such prior art materials after machining is shown in FIGS. 1c, 1d, 1g and 1h, and illustrates severe subsurface material pullout leading to premature tool failure, reduced flexural strength, and poor reliability.

FIG. 1d is a greatly enlarged portion of FIG. 1c, and FIG. 1h is a greatly enlarged portion of FIG. 1g. FIGS. 1g and 1h show the space left by the dislodgement of an iron silicide pocket, exposing extra large grains of beta silicon nitride associated with the silicide during solution recrystallization.

FIGS. 1i, 1j, 1k and 1l show a billet made in accordance with this invention, and visually demonstrate the absence of iron silicide or yttrium defects and thus give improved tool performance and flexural strength.

DETAILED DESCRIPTION

A preferred method for carrying out the invention herein is as follows.

1. A preform of starting ingredients is formed by compacting a mixture of silicon powder carrying silicon dioxide as a surface coating thereon and oxygen carrying powder agents. Reactive oxygen carrying agents is defined herein to mean ingredients that are effective to form intergranular second phase crystallites, particularly oxynitrides and/or silicates, in silicon nitride, when reacted with the silicon powder under heating such as under a heated nitrogen bearing atmosphere. The oxygen carrying agents may be selected from the group consisting of $Y_2O_3$, $Al_2O_3$, $SiO_2$, $MgO$, $CeO_2$, $ZrO_2$, $HfO_2$, and other rare earth oxides. Use of these agents will improve physical characteristics in the final product and formation of a second phase crystallite, which (a) will uniformly be dispersed, and (b) substantially displace the detrimental glassy silicate phase normally formed except for a controlled and limited amount of the latter.

For purposes of the preferred method, a uniform powder mixture is prepared with 2000 grams of silicon (86.6 weight percent of mixture), 278 grams $Y_2O_3$ (12 weight percent of mixture and 13.9% of silicon), and 32 grams $Al_2O_3$ (1.4 weight percent of mixture and 1.6% of silicon). $Y_2O_3$ is normally used in the range of 3–19% by weight of the silicon. The oxygen carrying agent, such as $Al_2O_3$, is used in the range of 0.4–5% by weight of the silicon. $SiO_2$ is present usually as an oxide on the silicon powder and increased to 1–3% by weight of the silicon by milling.

The silicon powder is preferably selected to have 97% or greater purity, advantageously 98% or greater, and a starting average particle size of 8–9.2 microns. The major trace metal contaminants experienced with such impurity include, as maximums: iron up to 1.0%, aluminum up to 0.2%, and manganese up to 0.10%. Nonmetallic contaminants include, as maximums: carbon up to 0.05%, and oxygen less than 0.5%. $SiO_2$ is present on the silicon powder but is not considered an impurity for this invention since it is reacted during nitriding to form intergranular second phases. The $Y_2O_3$ powder is selected to have a purity of at least 99.99% with an average crystallite size of 0.04 microns (400Å). Alumina is selected to have a purity of at least 99.5% with an average particle size of 0.3–0.5 microns. The yttria typically carries trace contaminants of Ca (3.4 ppm), Cr (<10 ppm), Fe (0.2 ppm), Mn (<6 ppm), and other rare earths. Alumina typically carries, as maximums: $SiO_2$ (0.07% by weight), $Fe_2O_3$ (0.03%), and $Na_2O$ (0.08%).

The mixture is comminuted and blended by being charged into an inert milling jar along with grinding media in the form of Burundum cylinders (85% $Al_2O_3$, 11% $SiO_2$, 2% $MgO$, 1.2% $CaO$, and less than 0.1% of [$TiO_2$, $Fe_2O_3$, $Na_2O$]). The milling media adds $Al_2O_3$ to the mixture by attrition. The mixture is milled for 48 hours at 64 rpm and then separated from the media by use of a #10 mesh screen. The milling is preferably dry to eliminate further introduction of impurities. The oxygen carrying agents must be in the reactive form with a high surface area and small crystalline size. The resulting milled mixture will have at least 50% by weight with an average particle size of about 3 microns. The surface oxygen level after milling will be increased to 1.6% by weight of the silicon and be present as an oxide coating ($SiO_2$) in an amount of 3.0 weight percent. The oxide coating should preferably never be stripped off. Preferably, the $Y_2O_3/SiO_2$ ratio is controlled to be in the range of 1.1–6.4 and optimally about 4.

A measured quantity of milled mixture is loaded into a cold pressed die arrangement and pressed at ambient conditions by use of 1400–1500 psi to form a cylindrical preform of a size of about 6 inches in diameter by 0.6 inch in thickness and a density of 1–1.4 $gm/cm^3$. The green density of such billet is typically in the range of 30–42% of full theoretical density and optimally around 35–37% of theoretical.

2. Heating to Nitride

The preform is heated in a nitriding atmosphere, without the use of pressure normally associated with hot pressing, to produce a silicon nitride comprising body consisting of $Si_3N_4$, at least one dispersed second phase crystallite, 0.2–1% silicate, and up to 1.0% by weight of free silicon and unreacted oxygen carrying agents such as $Y_2O_3$ and $Al_2O_3$. The body will have a size greater than and a density less than the ultimate object to be formed. The nitriding must be carried out sufficiently to form an envelope or encapsulate about the silicon particles for purposes of this invention.

To carry out heating to nitride, the preform is placed in an enclosed furnace, preferably evacuated to a pressure of less than 1 micron, and heated at a fast rate, i.e., 500° F./hr (278° C./hr) to 1200° F./hr (649° C./hr). The furnace is then filled with a gaseous mixture consisting substantially of nitrogen at a pressure of about 2.7 psig. The total $O_2$ and $H_2O$ content in such gaseous mixture is less than 4 ppm. The temperature of the furnace is then increased in steps to a nitriding temperature of 2000°–2550° F. (1093°–1399° C.). Fresh nitrogen is intermittently supplied to the furnace to replace the nitrogen consumed in forming $Si_3N_4$ and the oxynitrides. The nitrided object is then cooled to room temperature at a rate of about 250° F./hr (56° C./hr).

The nitrided body will preferably consist of silicon nitride (at least 60% of which is in the alpha form), 3-15% of a silicon oxynitride and the remainder essentially a silicate glass (which may be theorized to be an aluminum containing silicate). There can be present up to 1.0% free silicon, unreacted $Y_2O_3$, iron, iron oxide, and silicides such as chromium silicide ($Cr_3Si_2$) and very small amounts of silicates.

3. Leaching

The nitrided preform is immersed in one or more stages in one or more leaching solutions of effective concentration to remove selected impurities. Preferably, the primary leaching solution is an aqueous solution of hydrochloric acid in a concentration of 3-10 molar percent. Such acid solution is not effective in removing $SiO_2$, if present. Alternative leaching acids may comprise sulfuric acid, acetic acid, nitric acid, and oxalic acid. These acids are effective to dissolve a large number of silicides such as $Cr_3Si_2$ and silicides or silicates of Mn, Ni, Co, Li, Al, Ca and Na, but not iron silicide per se. The acids do dissolve iron, iron oxide, and unreacted $Y_2O_3$ which can form iron silicide during hot pressing, a time when the greatest quantities of iron silicides are formed.

The nitrided preform may additionally and advantageously be immersed in a basic solution containing sodium hydroxide in a concentration of about 5 molar percent which is effective to remove free silicon.

The billet or preform should be maintained in an immersed condition within said solutions for a period of 6-48 hours or by noting the color of the leaching solution. When it reaches a predetermined degree of yellow (for example, in connection with iron chloride in solution), the leaching effect has progressed to a satisfactory degree. Other methods by which the material can be tested to determine if leaching has proceeded to a satisfactory degree and has subtracted the necessary amount of impurities, include spectrophotometric techniques, plasma emission spectrometry, and atomic absorption spectrometry. It is important to point out that after each leaching immersion, the treated preform is preferably rinsed in deionized water for a few minutes to remove residual ions. For acid, such as hydrochloric acid, a silver nitrate test may be employed to determine the degree of removal of residual ions such as chloride ions. Other known tests may be employed for the reaction products of the base solution.

4. Heat Fusing

The nitrided body is then heated to heat fusing conditions to form a unitary, substantially fully dense silicon nitride comprisng object. Preferably, the nitrided body is hot pressed to produce such an object. A pressing fixuture having graphite walls is used to carry out hot pressing. The walls and nitrided body are both coated with a slurry of boron ntiride and dried. The pressing fixture with the nitrided body therein is placed in the hot pressing furnace. The heating and pressing is carried out preferably in increments: (1) a mechanical loading of 100 psi is applied at room temperature to the body; (2) the temperature is increased to 1800° F. (982° C.) and the pressure increased to 500 psi; (3) the temperature is then increased to 2500° F. (1371° C. ) and pressure simultaneously increased to 2500 psi; (4) the temperature is finally increased to the hot pressing temperature of 3000° F. (1649° C.) and pressure increased to 3700 psi, the latter conditions being maintained until at least 99% or desirably 99.5% of theoretical full density is achieved. This usually requires 0.25-3.0 hours at the hot pressing temperature. The object is then cooled at any rate, even quenched, to room temperature.

The resulting object will consist essentially of beta silicon nitride, preferably 3-15% by weight silicon oxynitrides enveloped by silicate phase having a thickness of 8-10 angstroms and having no microporosity. The object preferably possesses: (a) a hardness of about 91.5 on the 45-N scale, (b) a density of 3.2-3.33 gm/$cm^3$, (c) a fracture strength in range of 115-140 ksi at room temperature and of about 85,000-110,000 psi at 1200° C., each in a four-point bend test, and (d) an oxidation resistance that prevents weight pickup by the object after 450 hours in air at 1000° C. The object will notably be characterized by the absence of large beta silicon nitride grains and local concentrations of yttrium containing compounds (such as that exhibited in FIGS. 1a through 1l).

EXAMPLES

A series of cutting tool samples were prepared and tested to determine physical parameters and machining performance, and to illustrate how the use of unpurified starting powders and the use of leaching solutions, after nitriding silicon, achieved successful improvement in certain physical characteristics of the material, particularly the modulus of rupture. Sample bars of the ceramic were made using the composition and processing of the preferred mode. The material was fully nitrided to a density of 2.2 gm/$cm^3$ prior to leaching in the two sequential solutions, first HCl and then NaOH. The results showed that for conventional unpurified starting materials, which are not leached during processing, the resulting product had a hardness of 90 (on the 45-N scale) and a modulus of rupture of 90 ksi. When the same material was subjected to leaching in accordance with the preferred mode, the hardness increased to 91.5 and the modulus of rupture increased to 115-140 ksi. The Weibull modulus increased to a very favorable 14-18 for the leached material from 7-12 as the unleached material. The leached material had greater structural integrity for use as a cutting tool. The heat fused material was shaped to an SNG 434 cutting tool and subjected to wear tests which included milling and turning gray cast iron at 2621 sfm, depth of cut of 0.006 inch per revolution, and feed in successive, 0.10 inch deep passes. The flank wear after 162 minutes of cutting exhibited a very low 0.0062-0.0070 inch of wear compared to 0.0088 for the prior art. This demonstrates excellent homogeneity and uniformity, freedom of silicide flaws and large beta grain $Si_3N_4$, and freedom from local concentrations of unreacted $Y_2O_3$.

We claim:

1. A method of making a silicon nitride comprising object, comprising:
   (a) forming a preform by compacting a mixture of unpurified silicon powder and oxygen carrying agents in an amount effective to form intergranular second phase crystallites with $Si_3N_4$ upon heating in a nitrogen bearing atmosphere;
   (b) heating the preform in a nitrogen atmosphere to react the ingredients thereof and agglomerate the mixture to an increased density no greater than 2.7 gm/cm$^3$, said agglomerated preform being constituted of silicon nitride, silicon oxynitride crystallites, silicate, and impurities from the group consiting of Si, Fe, silicides, Fe$_2$O$_3$, and other oxygen carrying agents other than SiO$_2$;

(c) immersing said heat treated preform in one or more stages in one or more leaching solutions of effective concentration to substantially remove at least one of said group of impurities; and (d) heating said treated preform to heat fusing condition to form a unitary, substantially fully dense silicon nitride comprising object.

2. The method as in claim 1 in which said silicon powder has relative purity of at least 97%.

3. The method as in claim 1 in which said oxygen carrying agents comprise Y$_2$O$_3$, Al$_2$O$_3$ (each having a relative purity of at least 99.99%), and SiO$_2$, the latter being present substantially as an oxide coating on said silicon powder, and said intergranular second phases comprise essentially yttrium silicon oxynitrides.

4. The method as in claim 3, in which in one stage of step (c) an aqueous solution of one of hydrochloric acid, sulfuric acid, acetic acid, oxalic acid or nitric acid is used to leach out the impurities of iron, silicides, iron oxide, and unreacted Y$_2$O$_3$.

5. The method as in claim 4, in which in a second stage of step (c) an aqueous solution of sodium hydroxide, potassium hydroxide, or their equivalent, is used to substantially leach out free silicon.

6. The method as in claim 1 in which said density of said preform is in the range of 50–72% of full theoretical.

7. The method as in claim 1, in which said oxygen carrying agents are selected from the group consisting of Y$_2$O$_3$, Al$_2$O$_3$, SiO$_2$, MgO, CeO$_2$, ZrO$_2$, HfO$_2$, and other rare earths.

8. The method as in claim 1, in which at least one of said leaching solutions is an aqueous solution of hydrochloric acid.

9. The method as in claim 8, in wich the concentration of hydrochloric acid in said solution is in the range of 3–10 molar percent.

10. The method as in claim 1, in which said leaching solutions are selected from the group consisting of aqueous solutions of hydrochloric acid, sulfuric acid, acetic acid, oxalic acid, and nitric acid.

11. The method as in claim 10, in which a second solution is additionally and separately employed containing sodium hydroxide in a concentration of about 5 molar percent.

12. The method as in claim 8, in which the period of immersion in said leaching solution is for 6–48 hours.

13. The method as in claim 8, in which the immersion period in said leaching solution is determined by the attainment of a predetermined degree of color in said solution.

* * * * *